July 23, 1940.                A. S. T. LAGAARD                2,208,876
                                DOUGHNUT MACHINE
                        Filed Aug. 12, 1939         2 Sheets-Sheet 1

Alexander S.T. Lagaard

Inventor

By Caswell & Lagaard
                              Attorneys

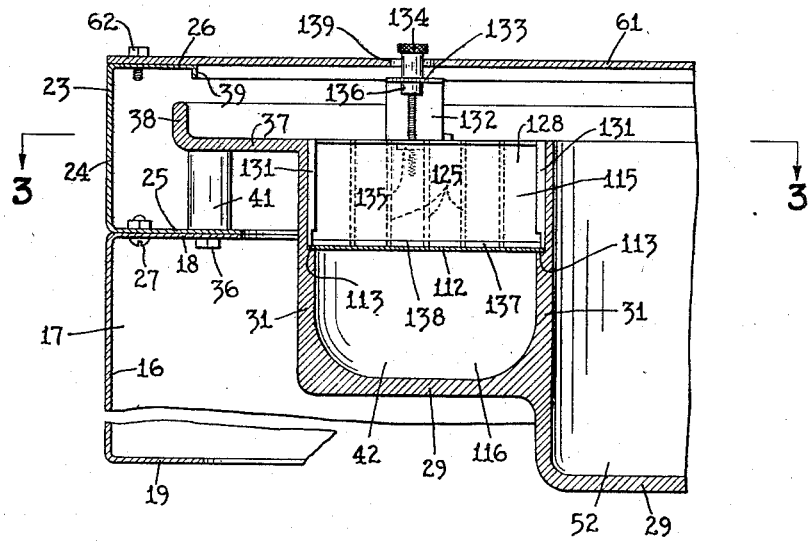
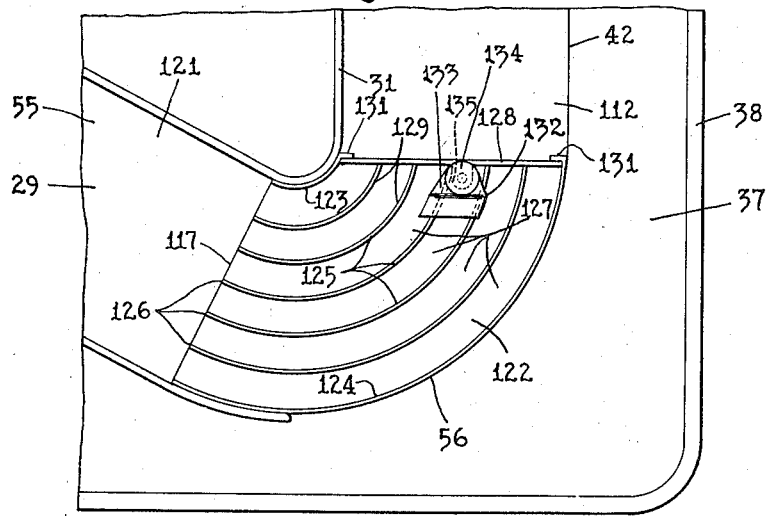

Patented July 23, 1940

2,208,876

UNITED STATES PATENT OFFICE 2,208,876

DOUGHNUT MACHINE

Alexander S. T. Lagaard, Minneapolis, Minn., assignor to Dough-King, Inc., Minneapolis, Minn., a corporation of Minnesota Application August 12, 1939, Serial No. 289,817

8 Claims. (Cl. 53—7)

My invention relates to doughnut machines and particularly to doughnut machines in which the doughnuts are progressed along a channel in a kettle throughout a circuitous course by means of the flow of the cooking liquid, and in which the doughnuts are inverted by a twisted doughnut turner.

In such machines considerable velocity of the cooking liquid is required to invert the doughnuts when passing through the turner. However, considerably less velocity is required to propel the doughnuts from the dough cutter up to the turner. Due to the fact that the doughnuts, when first deposited are soft and plastic the said doughnuts become flattened and distorted in shape when the rate of flow of the cooking liquid immediately following the doughnut cutter is the same as at the turner and sufficient to invert the doughnuts in the turner.

An object of the invention resides in providing a doughnut machine in which sufficient flow is procured for inverting the doughnuts in the turner and in which the flow is sufficiently reduced at the cutter to prevent deformation of the doughnuts.

Where the cooking liquid reaches the channel in which the raw doughnuts are deposited around a curve, it frequently occurs that the velocity of the cooking liquid is greater at the outer portion of the curve than at the inner portion of the curve. This causes eddies in the cooking liquid which prevent the doughnuts from moving away from the cutter. Such a condition requires increase in velocity of the cooking liquid which tends to distort the doughnuts and give the doughnuts an irregular shape.

Another object of the invention resides in providing a doughnut machine in which eddy currents produced at curves in the machine may be entirely eliminated.

A still further object of the invention resides in providing a drop plate on which the doughnuts are deposited and along which the doughnuts are progressed, which drop plate is situated at an elevation intermediate the height of the channel in which the doughnuts are deposited to divide the same into upper and lower passageways in which drop plate extends from a position rearwardly of the dough cutter and to a position in close proximity to the turner.

A feature of the invention resides in constructing said plate solid so as to definitely maintain separate rates of flow in the two channels formed by the drop plate.

Another object of the invention resides in providing means at the beginning of the drop plate for positively dividing the cooking liquid into two streams, one for each channel, and definitely maintaining separate rates of flow of cooking liquid in the two channels.

A still further object of the invention resides in providing a plurality of curved vanes disposed in the channel in advance of the turner for controlling the relative velocity of the cooking liquid throughout the transverse extent of the channel.

Another object of the invention resides in constructing said vanes concentric with the curvature of the channel and in arranging said vanes in vertical relation at the curve of the channel.

A still further object of the invention resides in providing a gate following the vanes and forming an opening at the locality of the drop plate for controlling the amount of cooking liquid entering the upper channel.

Another object of the invention resides in providing means for adjustably supporting the gate to vary the size of the opening into the upper channel.

Other objects of the invention reside in the novel combination and arrangement of parts and in the details of construction hereinafter illustrated and/or described.

In the drawings:

Fig. 2 is a fragmentary, elevational sectional view taken on line 2—2 of Fig. 1 and drawn to a greater scale.

Fig. 3 is a plan sectional view of a portion of the structure shown in Fig. 1 with the cover removed and taken on line 3—3 of Fig. 2 and drawn to the same scale as Fig. 2.

Figure 1:
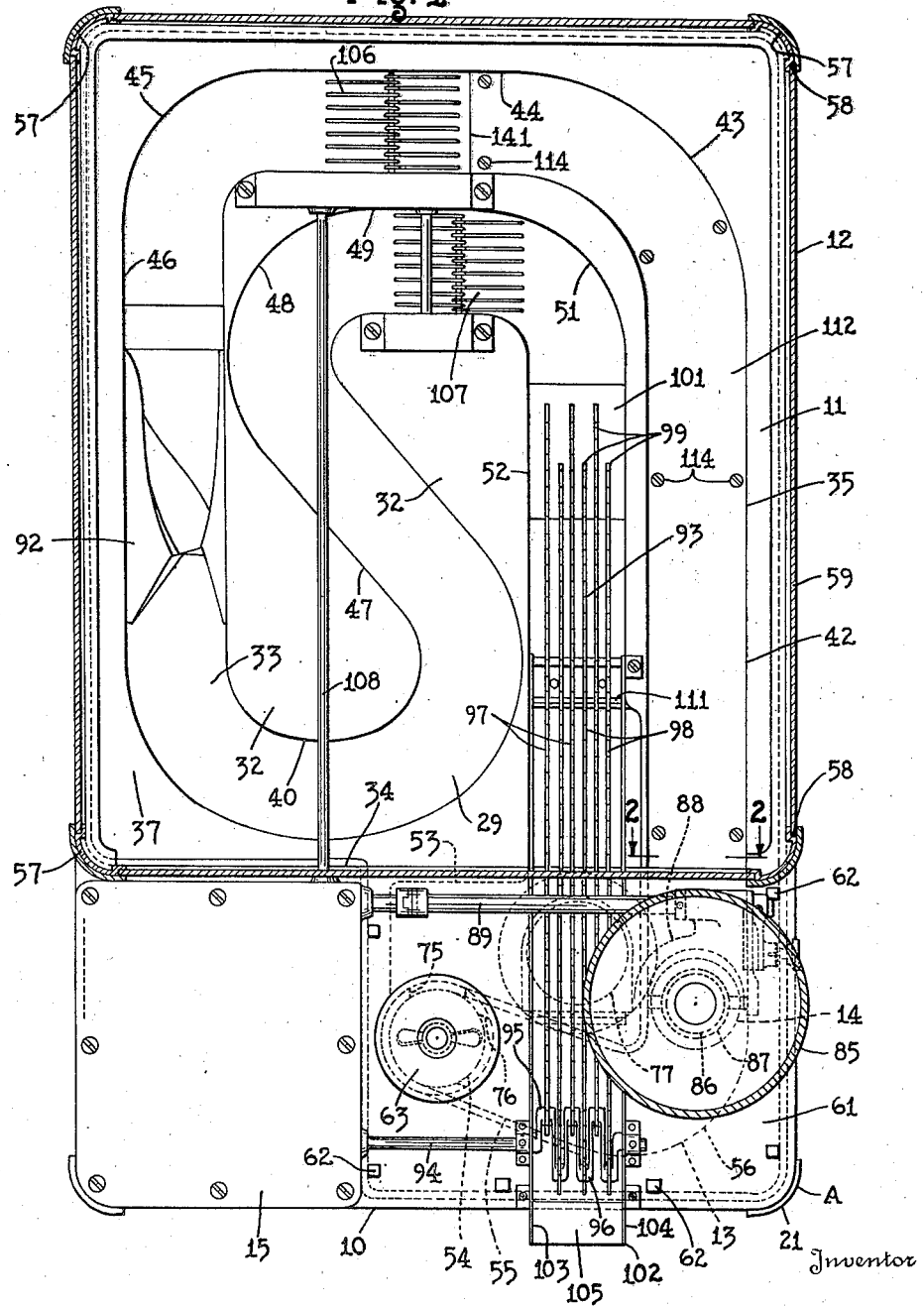
Fig. 1 is a plan sectional view of a doughnut machine illustrating an embodiment of my invention.

In the drawings I have shown a doughnut machine A which consists of a case 10 supporting a cooking kettle 11. A hood 12 superimposes the cooking kettle and covers a portion of the same leaving an extension 13 extending outwardly beyond said hood. Exteriorly of the hood 12 and above the extension 13 of the kettle 11 is a doughnut former 14 which forms and deposits raw doughnut formations into the portion of the channel in the kettle 11 disposed in the extension 13 thereof. A transmission disposed within a case 15, also situated exteriorly of the hood 12 operates the various parts of the invention. These various parts will now be described in detail.

The case 10 may be of any suitable construction and, as shown in Fig. 2, is formed of sheet metal. This case is constructed with side walls 16 and end walls 17 bent out of sheet metal. At the upper and lower edges of the walls 16 and 17 are formed flanges 18 and 19 which stiffen the walls and form a rigid support for the kettle and other parts of the machine. Reinforcing corner post 21, attached to the walls 16 and 17 at the junctures thereof may also be used, if desired. The lower flanges 19 may be supported on casters, legs, or in any other suitable manner to hold the case at proper elevation above the floor on which the doughnut machine rests. Resting on the flange 18 is a supporting member 23 which is constructed with a web 24 and flanges 25 and 26 extending inwardly therefrom. Supporting member 23 extends about the walls 16 and 17 and forms a support for the kettle 11. This supporting member is so constructed that the web 24 thereof lies in continuation of the portions of the walls 16 and 17 above which the supporting member is disposed. Said supporting member is attached to the case 10 by means of bolts 27 which pass through the flanges 25 and 18.

Within the case 10 is disposed a cooking kettle 11, previously referred to, which is preferably of cast metal and which is constructed with a bottom 29 and with vertical walls 31 extending upwardly therefrom. The vertical walls are connected at their upper ends with upper walls 32 and the various walls are so arranged as to form a channel 33 which extends throughout the major portion of the kettle and which provides a way along which the doughnuts may travel. The kettle 11 has one corner of the same removed, as designated at 34, to receive the transmission 15 leaving the main portion 36 confined within the hood 12 and the extension 13 projecting outwardly therefrom. The kettle 11 is constructed with a ledge 37 extending about the margin of the same which terminates in a lip 38, projecting upwardly from the extreme edge thereof. A guard 39 in the nature of a depending lip is formed on the flange 26 of the supporting member 23 and overlies the lip 38, thereby protecting the same, and at the same time being spaced therefrom to retard transmission of heat from the kettle to the case. The kettle 11 is supported on the supporting member 23 through supporting blocks 41 which are cast integral with said ledge 37 and rest on the flange 25. Cap screws 36, screwed through the flanges 18 and 25 and into the blocks 41, hold the kettle in position.

The channel 33 is arranged to provide a straight run 42 which commences in close proximity to the end wall 17 adjacent the transmission 15. This run follows along the side wall 16 adjacent the cutter 14. The channel 33 at the end of the run 42 makes a curve 43 which leads into another straight run 44 following along the other end wall 17. At the end of this run the channel has a curve 45 which leads into still another straight run 46 which follows along the other side wall 16. At the end of the run 46 the channel is constructed with a loop 40 which communicates with a straight run 47 arranged diagonally of the kettle. The latter run communicates with a curved run 48 which in turn communicates with a straight run 49 parallel with the run 44. The run 49 communicates with another curved run 51 which, in turn, communicates with a straight run 52 parallel with and closely positioned with respect to the run 42. The run 52 discharges into a reservoir 53 which is merely an enlargement of said run. This reservoir is disposed in the extension 13 of the kettle. In this reservoir is provided a well 54 which communicates with a short run 55 also disposed in the extension 13. The run 42, previously referred to, extends outwardly beyond the hood 12 and into the extension 13 where the same is connected by means of a curved run 56 with the short run 55.

The hood 12 consists of four posts 57 which are attached to the supporting member 23 and which are provided with guide ways 58 which slidably support windows 59. A top is also used with the hood which covers the upper portion of the same, and which, in conjunction with the windows, confine the space above the kettle 11. The extension 13 of kettle 11 is covered by means of a cover plate 61 which is attached to the flanges 26 of supporting member 23 by means of bolts 62.

Attached to the plate 61 is a motor 63 which is situated above the well 54. Attached to the lower end of the armature shaft of motor 63 and disposed within well 54 is a propeller 74 which serves to elevate the cooking liquid and discharge the same at an elevation above said propeller. An inlet port 75 is formed in the lower portion of the well 54 which communicates with the reservoir 53. An outlet port 76 near the upper portion of the well 54, communicates with the short run 55 which leads into run 42 of the channel 33.

At the lowermost portion of the machine is provided a cleanout 77, as shown in Fig. 1, which is used for removing the cooking liquid from the kettle 11 and also for removing the crumbs therefrom. This construction forming no feature of the instant invention has not been shown in detail in the drawings.

Situated at the beginning of the run 42 of channel 33 is the doughnut former 14 previously referred to, which comprises a receptacle 85 for dough and a cutter 86 connected therewith. Such construction being well known in the art will not be described in detail in this application. The cutter 86 includes a flanged sleeve 87 which severs dough extrusions from the mass contained in receptacle 85. This sleeve is reciprocated in opposite directions by means of a forked arm 88, which is mounted on a shaft 89. Shaft 89 is operated by a motor and transmission enclosed within the transmission housing 15. Inasmuch as the driving mechanism for the shaft 89 does not form a feature of the instant invention, the same has not been illustrated. It will thus readily become apparent that doughnuts extruded from the doughnut former 34 are deposited in the flowing cooking liquid which travels along the run 52 of channel 33 in the direction of the arrow.

In the run 46 of channel 33 is arranged a twisted tubular turner 92. This turner inverts the doughnuts after the same have been cooked a predetermined length of time so that the said doughnuts may be cooked equally on both sides thereof.

In the run 52 of channel 33 is disposed an ejector 93 for removing the cooked doughnuts from the cooking liquid. This ejector comprises a shaft 94 which is constantly driven from the transmission within the housing 15. This shaft has mounted on it oppositely extending cranks 95 and 96. Sets of toothed blades 97 and 98 are mounted on the said cranks and are adapted to be alternately raised and lowered as the shaft 94 rotates. The lower ends 99 of these blades slide upon an inclined rest 101 which is mounted on the bottom 29 of the kettle 11 in the portion of the run 52 leading from the curved run 51. It will readily be comprehended that, as the doughnuts reach the said blades, the doughnuts are elevated and progressed upwardly and outwardly of the cooking kettle 38. The ejector 93 is disposed within a trough 102 constructed with two side plates 103 and 104 and a bottom 105 at the discharge end thereof, which directs the doughnuts upon leaving the ejector outwardly of the machine.

For controlling the rate of travel of the doughnuts along the channel 33 two controlling devices 106 and 107 are employed. These control devices operate to allow the doughnuts, one at a time, to enter the turner 92 and the ejector 93. These control devices are operated by a shaft 108 driven from the transmission within the housing 15 and are moved periodically at predetermined intervals. Inasmuch as any desired construction may be used for this purpose and since this construction does not form a particular feature of the instant invention, the details thereof have not been shown, nor will the same be described specifically. Where the machine is of fairly large capacity, the control devices 106 and 107 may be omitted and the rate of flow of the cooking liquid utilized to time the cooking of the doughnuts.

The elevation of the cooking liquid in the kettle 11 is maintained by means of a dam 111 situated in the run 52 of channel 33 at the locality of the beginning of the reservoir 53. The cooking liquid in flowing through the channel 33 passes over this dam which serves as a wier and is maintained at a predetermined elevation thereby.

The invention proper consists of a drop plate 112 which is disposed in the runs 56, 42 and 43 and a portion of the run 44 of channel 33. This drop plate is constructed from sheet metal and rests on a ledge 113 formed along the walls 31 of the kettle 11. The said drop plate is held in position by means of screws 114, screwed into enlargements of the said walls. The said drop plate is situated at an elevation intermediate the bottom 29 and the ledge 37 to divide the portion of the channel 33 in which it is situated into upper and lower passageways 115 and 116. The drop plate 112 is solid and forms a fairly tight fit with the ledge 113 so that the two channels 115 and 116 are separate from one another. As best shown in Fig. 3 the drop plate 112 terminates along a line 117 inwardly of the innermost of the walls 31 of channel 42 which, however, falls short of the well 54, to leave an open space 121 in the channel 55 in advance of said drop plate.

It will be noted that a portion 122 of the drop plate 112 is curved and lies in the curved run 56 of the channel 33. Superimposing this portion of the run are a number of vertically extending blades. The outermost of these blades are designated by the reference numerals 123 and 124 and fit along the inner surfaces of the walls 31 of the run 56 of channel 33. The intermediate of the said blades are designated by the reference numeral 125. These blades may be welded or otherwise secured to the portion 122 of the drop plate 112. The ends 126 of all of the blades 123, 124 and 125 are disposed in the straight run 55, so that the cooking liquid which enters the run 56 is divided by the said blades into equal streams which are conducted along the narrow arcuate passageways 127 formed between the various blades 123, 124 and 125. The individual streams of cooking liquid flowing along the passageways 127 are united upon leaving the blades 123, 124 and 125, and continue as a single stream in the upper passageway 115 of the run 42 of channel 33 at the locality of deposit of raw doughnuts in said channel and up to the control device 106.

For controlling the amount of cooking liquid entering the upper passageway 115 in channel 42, a gate 128 is provided. This gate extends vertically and abuts against the ends 129 of the blades 125. Said gate is guided for vertical movement along said ends 129 of the blades by means of guides 131 formed on the ends of blades 123 and 124. For raising and lowering the gate 128, a bracket 132 is utilized, which is attached to two of the blades 125. This bracket is formed with an ear 133 which is drilled to receive a screw 134. Screw 134 is threaded to screw into a tapped lug 135 formed on the gate 128. A collar 136 on the screw 134 deprives the same from endwise movement with reference to the ear 133 and causes the gate 128 to be raised or lowered as the screw 134 is rotated. By means of this construction, a slot 137 is formed between the lower edge 138 of gate 128 and the upper surface of the drop plate 112. By means of the size of this slot the amount of cooking liquid entering the passageway 115 of the channel 42 may be controlled at will. The screw 134 projects upwardly through an opening 139 in the plate 61 where said screw is accessible and may be manually turned while the machine is in operation.

The operation of the invention is obvious. The cooking liquid is brought up to the desired temperature by heating means, not shown in the drawings, and so maintained throughout the use of the invention. Upon energizing motor 63 the cooking liquid is drawn from the reservoir 53 and discharged into the run 55 of channel 33. Where the speed of the motor or the capacity of the propeller is variable the same are adjusted until the proper rate of flow of the cooking liquid is secured to procure inversion of the doughnuts in the turner 92. The gate 128 is next adjusted by manipulation of screw 134 which projects upwardly beyond the surface of the plate 61. When the required amount of flow in the passageway 115 is procured, the doughnuts move slowly away from the doughnut former 14 and cook properly so that distortion of the doughnuts, when they reach the control device 106 is prevented. The cooking liquid in passageway 116 at the end 141 of drop plate 112 unites with that in passageway 115 and produces enough current to invert the doughnuts in turner 92.

The advantages of my invention are manifest. A doughnut machine constructed in accordance with my invention is extremely simple and practical to operate requiring a minimum amount of attention on the part of the operator. Due to the construction of the drop plate and the mechanism associated therewith, accurate control of the flow of the cooking liquid in the passageway of the channel in which the doughnuts are deposited can be procured. With my invention crumbs are kept out of the lower passageway so the cleaning of the same is hardly ever required. With my invention any rate of flow can be had through the turner so that positive inversion of the doughnuts is procured. Adjustment of the flow through the upper passageway is readily controlled while the machine is in operation.

Changes in the specific form of my invention, as herein disclosed, may be made within the scope of what is claimed without departing from the spirit of my invention.

Having described my invention, what I claim as new and desire to protect by Letters Patent is:

1. In a doughnut machine, means forming a channel along which the doughnuts are progressed, impelling means situated in the channel for impelling the flow of cooking liquid along the channel, depositing means for depositing raw doughnut formations in the cooking liquid at a locality following the impelling means, a turner spaced from said depositing means, a drop plate disposed beneath the depositing means and extending toward said turner, said drop plate dividing the channel into upper and lower passageways, the impelling means discharging into the lower passageway, said drop plate being imperforate for a distance following the depositing means to maintain definite rates of flow in the upper and lower passageways, and means providing an inlet from the lower passageway to the upper passageway at a locality between the impelling means and the depositing means.

2. In a doughnut machine, means forming a channel along which the doughnuts are progressed, impelling means situated in the channel for impelling the flow of cooking liquid along the channel, depositing means for depositing raw doughnut formations in the cooking liquid at a locality following the impelling means, a turner spaced from said depositing means, a drop plate disposed beneath the depositing means and extending toward said turner, said drop plate dividing the channel into upper and lower passageways, the impelling means discharging into the lower passageway, said drop plate being imperforate for a distance following the depositing means to maintain definite rates of flow in the upper and lower passageways, and means providing a transverse slit forming an inlet from the lower passageway to the upper passageway at a locality between the impelling means and the depositing means.

3. In a doughnut machine, means forming a channel along which the doughnuts are progressed, impelling means situated in the channel for impelling the flow of cooking liquid along the channel, depositing means for depositing raw doughnut formations in the cooking liquid at a locality following the impelling means, a turner spaced from said depositing means, a drop plate disposed beneath the depositing means and extending toward said turner, said drop plate dividing the channel into upper and lower passageways, the impelling means discharging into the lower passageway, said drop plate being imperforate for a distance following the depositing means to maintain definite rates of flow in the upper and lower passageways, and means providing a transverse slit situated substantially at the surface of said drop plate and forming the inlet from the lower passageway to the upper passageway at a locality between the impelling means and the depositing means.

4. In a doughnut machine, means forming a channel along which the doughnuts are progressed, impelling means situated in the channel for impelling the flow of cooking liquid along the channel, depositing means for depositing raw doughnut formations in the cooking liquid at a locality following the impelling means, a turner spaced from said depositing means, a drop plate disposed beneath the depositing means and extending toward said turner, said drop plate dividing the channel into upper and lower passageways, the impelling means discharging into the lower passageway, said drop plate being imperforate for a distance following the depositing means to maintain definite rates of flow in the upper and lower passageways, and a plate extending across said channel and spaced from the end of the drop plate to form a slit at the end of the drop plate and substantially at the upper surface thereof providing an inlet from the lower passageway to the upper passageway at a locality between the impelling means and the depositing means.

5. In a doughnut machine, means forming a channel along which the doughnuts are progressed, impelling means situated in the channel for impelling the flow of cooking liquid along the channel, depositing means for depositing raw doughnut formations in the cooking liquid at a locality following the impelling means, a turner spaced from said depositing means, a drop plate disposed beneath the depositing means and extending toward said turner, said drop plate dividing the channel into upper and lower passageways, the impelling means discharging into the lower passageway, said drop plate being imperforate for a distance following the depositing means to maintain definite rates of flow in the upper and lower passageways, and a vertically extending baffle plate spaced above the upper surface of the drop plate and forming in conjunction therewith an inlet from the lower passageway to the upper passageway at a locality between the impelling means and the depositing means.

6. In a doughnut machine, means forming a channel along which the doughnuts are progressed, impelling means situated in the channel for impelling the flow of cooking liquid along the channel, depositing means for depositing raw doughnut formations in the cooking liquid at a locality following the impelling means, a turner spaced from said depositing means, a drop plate disposed beneath the depositing means and extending toward said turner, said drop plate dividing the channel into upper and lower passageways, the impelling means discharging into the lower passageway, said drop plate being imperforate for a distance following the depositing means to maintain definite rates of flow in the upper and lower passageways, a vertically extending baffle plate spaced above the upper surface of the drop plate and forming in conjunction therewith an inlet from the lower passageway to the upper passageway at a locality between the impelling means and the depositing means, and means for guiding said baffle for movement toward and away from said plate to vary the area of said slit and for holding the baffle in adjusted position.

7. In a doughnut machine, means forming a channel along which the doughnuts are progressed, impelling means situated in the channel for impelling the flow of cooking liquid along the channel, depositing means for depositing raw doughnut formations in the cooking liquid at a locality following the impelling means, a turner spaced from said depositing means, a drop plate disposed beneath the depositing means and extending toward said turner, said drop plate dividing the channel into upper and lower passageways, the impelling means discharging into the lower passageway, said drop plate being imperforate for a distance following the depositing means to maintain definite rates of flow in the upper and lower passageways, said drop plate extending along said bend and a plurality of curved blades arranged at said bend and extending away from said drop plate, said blades following the curve of said bend and dividing the cooking liquid into a number of streams of predetermined cross sectional area.

8. In a doughnut machine, means forming a channel along which the doughnuts are progressed, impelling means situated in the channel for impelling the flow of cooking liquid along the channel, depositing means for depositing raw doughnut formations in the cooking liquid at a locality following the impelling means, a turner spaced from said depositing means, a drop plate disposed beneath the depositing means and extending substantially up to said turner, said drop plate dividing the channel into upper and lower passageways, the impelling means discharging into the lower passageway, said drop plate being imperforate for a distance following the depositing means to maintain definite rates of flow in the lower and upper passageways and means providing an inlet from the lower passageway to the upper passageway at a locality between the impelling means and depositing means.

ALEXANDER S. T. LAGAARD.